United States Patent [19]

Snellman et al.

[11] E Re. 29,133

[45] Reissued Feb. 8, 1977

[54] CONSTANT LENGTH COMPOSITE GLASS FIBER CABLE UNDER VARYING TEMPERATURE CONDITIONS

[75] Inventors: Donald L. Snellman; Willard G. Hudson, both of Seattle, Wash.

[73] Assignee: Norfin, Inc., Seattle, Wash.

[22] Filed: Feb. 18, 1975

[21] Appl. No.: 550,299

Related U.S. Patent Documents

Reissue of:

[64] Patent No.: 3,821,879
Issued: July 2, 1974
Appl. No.: 311,361
Filed: Dec. 1, 1972

[52] U.S. Cl. ..... 57/140 G; 57/149; 57/162

[51] Int. Cl.[2] ..... D02G 3/18; D02G 3/40

[58] Field of Search ..... 57/140 G, 140 C, 157, 57/149, 162, 164, 144, 160

[56] References Cited

UNITED STATES PATENTS

| | | | |
|---|---|---|---|
| 3,309,861 | 3/1967 | Pierson et al. | 57/140 G |
| 3,371,476 | 3/1968 | Costello et al. | 57/149 |
| 3,662,533 | 5/1972 | Snellman et al. | 57/140 G |

*Primary Examiner*—John Petrakes
*Attorney, Agent, or Firm*—Dowrey & Cross

[57] ABSTRACT

A composite glass fiber cable is disclosed having a negative linear coefficient of thermal expansion which is controllable by variation of the *helical angle or angles of* twist of helically plied glass roving to substantially zero change in length over a wide variation in environmental temperatures under varying load conditions. *It is possible, by controlling the helical angle and maintaining it constant from the cable center to outer surface, to control thermal elongation effects on the cable to obtain either expanding, contracting or constant length cables over a wide temperature range.*

13 Claims, 10 Drawing Figures

FIG. 1
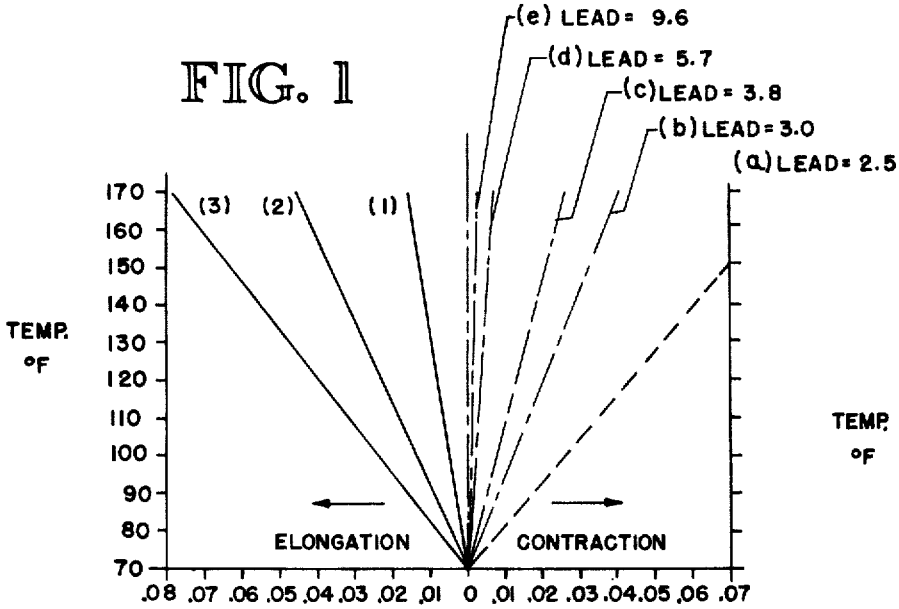
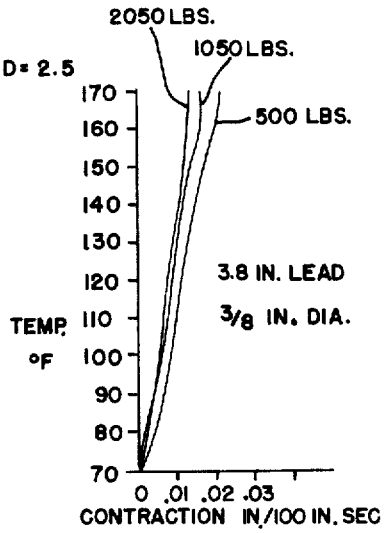
FIG. 2
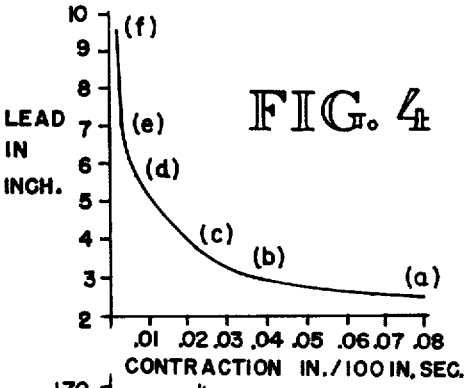
FIG. 4
FIG. 5
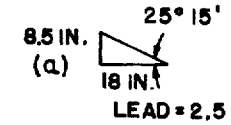
FIG. 6
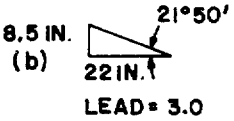
FIG. 7
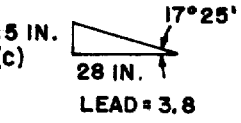
FIG. 8
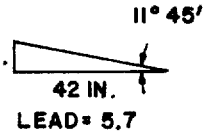
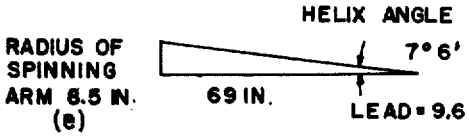
FIG. 9
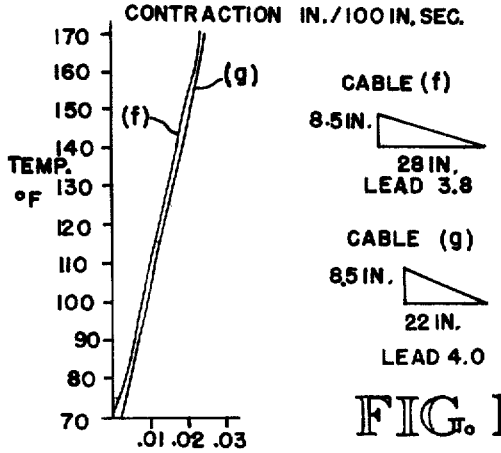
FIG. 10
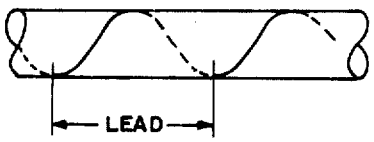
FIG. 3

CONSTANT LENGTH COMPOSITE GLASS FIBER CABLE UNDER VARYING TEMPERATURE CONDITIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a multi-strand composite glass fiber cable which contracts during heating with the degree of contraction controllable to produce a cable which has substantially zero change in length under widely varying temperature conditions.

2. Prior Art Relating to the Disclosure

Metallic and non-metallic cable structures in use today are subject to varying degrees of elongation under tensile loading. The amount of elongation varies, depending in part on the temperature of the cable. For use in supporting transmission lines and other uses it is desirable to have a cable having high tensile strength and low elongation change under varying temperature conditions.

A coreless composite glass fiber cable made up of multiple layers of glass fiber rovings plied together at a constant helical angle with each of the glass [fibers] *filaments* of the cable covered with a cured elastomeric sheath is disclosed in U.S. Pat. No. 3,662,533, assigned to the assignee of the present application. Cables constructed according to the referred to patent have properties of high tensile strength and low elongation; however, no means has been known for controlling the elongation properties of the composite cable under varying temperature conditions.

SUMMARY OF THE INVENTION

This invention relates to a composite fiberglass cable of the type disclosed in U.S. Pat. No. 3,662,533 wherein it has been discovered that control of the helical angle at which the multiple layers of glass fiber roving are plied may be used to control change in length under varying temperature conditions. The cable is made by plying multiple layers of glass fiber rovings using an apparatus similar to the apparatus described in U.S. Pat. No. 3,662,533 with each of the glass [fibers] *filaments* completely surrounded by a [curved] *cured* elastomeric sheath. The helical angle of each layer of rovings is maintained constant from the cable center to the outer surface. The lead or length of roving for each full twist varies for each layer of rovings. The helical angle may be equal to or less than about 12° and ranges preferably from about 5° to 9°. *Thus, it is possible by controlling the helical angle and maintaining it constant from the cable center to outer surface, to control the thermal elongation effects on the cable to obtain either expanding, contracting or constant length cables over a wide temperature range.*

BRIEF DESCRIPTION OF THE DRAWINGS

FIG. 1 is a graph illustrating elongation characteristics of cable of conventional material and contraction characteristics of composite fiberglass cables made according to the description herein having varying helical angles under varying temperature conditions.

FIG. 2 is a graph of temperature v. contraction of composite glass fiber cables under varying tensile loads;

FIG. 3 illustrates a partial cross-section of the composite cable for purposes of defining the term "lead"; and FIG. 4 is a graph of lead in inches v. contraction in inches for a 100 inch cable section;

FIG. 5 through 9 illustrate the helical angle and lead in inches of composite glass fiber cables whose contraction characteristics under varying temperature conditions are illustrated by FIG. 1; and FIG. 10 is a graph illustrating properties of composite cables fabricated with the same helical angle but differing diameters and elastomer contents.

DETAILED DESCRIPTION OF THE INVENTION

It was an unexpected discovery that composite glass cables of the type disclosed in U.S. Pat. No. 3,662,533, the disclosure of which is hereby incorporated by reference, could be formed to maintain a substantially constant length under varying temperature conditions by control of the [lead or] helical angle at which the cable is fabricated. *As will be understood by referring to the aforementioned United States Patent, the term "filament" as used herein refers to a fiber of indefinite length and the term "roving" refers to a plurality of substantially untwisted, parallel filaments.* As used herein the term "lead" means the linear distance along the axis of the cable that it takes a glass fiber roving [or filament] to make one complete revolution (360°) about the surface of the cable as illustrated in FIG. 3 and is calculated by the equation: lead (inches) = cotangent helical angle $\times \pi \times$ diameter of cable. The term "helical angle" as used herein means the angle between the horizontal plane formed by the cable being plied and a plane through the glass fiber rovings pulled from the cabling head as indicated by FIGS. 5 to 9.

The composite glass fiber cable is made by spirally twisting together in the same direction at substantially the same helical angle a plurality of glass fiber [filaments or] rovings with each [of the filaments] *roving* making up the cable impregnated with an uncured elastomer. Alternatively, *a two component system may be used wherein* certain of the rovings making up the cable may be impregnated with one component of the uncured elastomer and the remainder of the rovings impregnated with a curing agent or hardener for the uncured elastomer. *When the individual rovings are wound together helically, the two components react to form a cured elastomeric cable matrix comprising* [The finished cable comprises] multiple layers of glass fiber rovings with *the filaments of* each [of the glass fibers making up the cable encased] *roving surrounded* completely with a cured elastomeric sheath *and bonded to the elastomeric sheaths surrounding adjacent filaments of both the same and adjacent layers.* The *finished* cable is substantially homogenous in cross-section and without a central core.

The method and apparatus for fabricating the cable is essentially the same as that described in U.S. Pat. No. 3,662,533. A planetary cabling machine is used capable of helically winding individual glass fiber rovings together without twisting them. Spools of glass fiber rovings are spaced around the periphery of a planetary cabling machine with applicators adjacent each of the spools for applying an uncured elastomeric resin such as a polyurethane resin to the rovings as they pass through the applicators. The planetary cabling head with the spools of rovings thereon is rotated and the rovings twisted together to form the cable. *The helical angle is maintained constant during lay-up from the cable center to outer surface.* When an endless cable is desired the plied together cable is fed back through the juncture or common meeting point of the intertwined rovings and subsequent layers of roving plied about the initial layer. Multiple cabling heads may be used to make a composite glass fiber cable of indefinite length, the cable made up of multiple layers of glass fiber rovings applied at multiple cabling stations along a linear run. The finished cable is coreless with all of the [filaments] *rovings* making up the cable at substantially the same helical angle and all filaments coated with a cured elastomeric sheath.

The preferred elastomers used in fabricating cables of this invention are urethane elastomers made by mixing a urethane prepolymer with a curing agent or hardener for the resin in predetermined quantities. Urethane resins of the type used are commercially available.

It was discovered that variations in the helical angle [or lead] at which the cables were fabricated gave a finished cable which, under varying temperature conditions, contracted under a given tensile load. This was totally unexpected as most cable material conventionally used elongates with increasing temperature. The discovery of this property of the cable led to the making of a cable which, under widely varying temperature conditions, maintains a substantially constant length. By choosing a helical angle [or lead] within a designated range *and maintaining it constant during application of all layers of roving from the cable center to outer surface*, a cable can be plied which maintains a constant length over a wide range of temperature conditions.

FIG. 1 of the drawings illustrates contraction of the composite cable of this invention at varying helical angles under temperatures ranging from 70 to 170° F. contrasted with elongation of other materials conventionally used in cable construction under temperatures ranging from 70°F. to 170° F. All of the cables tested were subjected to a tensile load of about 2,000 lbs.

Test cable 1 consisted of a cylindrical grouping of parallel glass fibers which, when subjected to a tensile load of about 2,000 lbs. and heated from about 70° F. to 170° F. elongated about 0.015 inches for a 100-inch cable section.

Cable 2, a wire rope 5/16-inch in diameter, elongated about 0.045 inches for a 100 inch cable section at 170° F.

Cable 3 consisting of steel banding 0.025 × 0.500 inches elongated about 0.078 inches for a 100 inch cable section at 170° F.

Contrasted with the expansion of the materials *above* described, the composite glass fiber cable of this invention *either expands*, contracts *or maintains essentially constant length*, dependent on the helical angle [or lead] *at which the glass rovings are plied*, as the cable temperature is increased. All of the cables referred to in FIG. 1 were 3/8-inch in diameter fabricated in a manner described in U.S. Pat. No. 3,662,533 except that the uncured urethane resin applied to the glass fiber rovings prior to twisting incorporated the curing agent. *It will be understood, of course, that all reference hereinafter to a particular "lead" both in the specification and drawings refers to the "lead" distance of the layer of rovings on the outer layer or finished diameter of the cable concerned.* As illustrated by FIG. 1 cable (a) having a helical angle of about 25° 15 minutes and a lead of 2.5-inches contracted about 0.070 inches for a 100-inch cable section as the temperature was increased from 70° F. to 170° F. Cable (b) having a helical angle of about 21° 50 minutes and a lead of about 3.0 inches [elongated] *contracted* about 0.04 inches for a 100 inch cable section as the temperature increased from 70° F. to 170° F. Cable (c) having a helical angle of 17° 25 minutes and a lead of 3.8 inches contracted about 0.025 inches for a 100 inch cable section as the temperature increased from 70° F. to 170° F. Cable (d) having a helical angle of 11° 45 minutes and a lead of 5.7 inches [elongated] *contracted* about 0.007 inches for a 100 inch cable section as the temperature was increased from 70° F. to 170° F. *Cable (e) having a helical angle of 7° 6 minutes and a lead of 9.6 inches contracted about 0.002 inches per 100 inch cable section as the temperature increased from 70°F. to 170°F.*

The tensile load to which the composite glass fiber cable is subjected apparently has no effect on the contraction properties of the composite cable during heating thereof, at least under tensile loadings that would be normally encountered in use of the cables. This is illustrated by FIG. 2, a graph of temperature in °F. vs. contraction in inches of a 100 inch section of cable subjected to tensile loadings of 500 lbs., 1050 lbs., and 2050 lbs. The cable tested was [1-] 3/8" in diameter having a lead of 3.8 and a helical angle of about 17° 25 minutes.

FIG. 4, a graph of the lead in inches vs. contraction in inches for a 100 inch cable section illustrates the increase in thermal stability of composite glass fiber cables with increase in the helical angle. The cables tested were the same as those described with respect to FIG. 1, all having a diameter of 3/8". As illustrated in FIG. 4 above a lead of about 6.5 the composite cable is essentially thermally stable at temperatures ranging from 70° F. to 170° F. From about 5.7 to 6.5 the composite glass fiber cable contracts as the temperature increases, but not at a significant rate. Below a lead of about 5.7, however, the composite glass fiber cable is subject to increasing contraction with temperature increase such that the cable is not thermally stable under temperature conditions outlined.

As illustrated in FIG. 10 composite glass fiber cables were fabricated having essentially the same [lead or] helical angle but differing diameters and elastomer content. Under a tensile load of about 2000 lbs. and variations of the temperature from 70° F. to 170° F. the cables had essentially the same characteristics indicating that the cable diameter and elastomer content of the cable does not apparently effect the contraction characteristics of the composite cable.

A composite glass fiber cable of the type described herein can be made which [maintains a substantially constant length under varying temperature conditions by maintaining the lead at which the cable is laid up above about 5.7 inches and preferably above about 6.4 inches or the helical angle no greater than about 12° and preferably no greater than about 9°.] *will either expand, contract or remain constant in overall length over a wide temperature range, depending upon the helical angle at which the glass roving is applied. Thus, by selecting the helical angle at which the glass roving is applied and maintaining it constant from the cable center*

*to outer surface, it is possible to control thermal elongation effects on the cable.*

The embodiments of the invention in which a particular property or privilege is claimed are defined as follows:

1. A composite cable structure composed of multiple layers of helically wound glass fiber rovings with each of the glass [fibers] *filaments* making up each roving completely surrounded by a cured elastomeric sheath bonded to the elastomeric sheaths surrounding adjacent filaments of both the same and adjacent rovings, each layer of roving having the same helical angle as the initial and adjacent layers of roving, the helical angle selected to produce a cable of controlled elongation over a wide temperature range under varying tensile loads.

2. [A] *The composite* cable structure of claim 1 wherein the helical angle is no greater than about 12°.

3. The composite cable structure of claim 1 wherein the helical angle ranges from about 5 to 9°.

4. The composite cable of claim 1 wherein the elastomer is a urethane elastomer.

5. A composite cable structure composed of multiple layers of helically wound glass fiber rovings with each of the glass [fibers] *filaments* making up each roving completely surrounded by *a* cured elastomeric sheath bonded to the elastomeric sheaths surrounding adjacent filaments of both the same and adjacent rovings, each layer of roving having the same helical angle as the initial and adjacent layers of roving, the helical angle being no greater than about 12°, such that the composite cable maintains an essentially constant length under widely varying temperature conditions.

6. A method of making a composite cable structure composed of multiple layers of helically wound glass fiber rovings with each of the glass [fibers] *filaments* making up each roving completely surrounded by a cured elastomeric sheath, the composite cable capable of maintaining substantially constant length under varying temperature conditions, comprising:

twisting a plurality of glass fiber rovings, the glass [fibers] *filaments* of which are individually coated with an uncured elastomeric resin incorporating a curing agent or hardener therein to form an initial lay-up, twisting further layers of glass fiber rovings, the glass [fibers] *filaments* of which are coated with an uncured elastomeric resin, around the initial lay-up in the same direction until a cable of desired cross-sectional diameter is obtained, and maintaining the helical angle of the initial and subsequent rovings during lay-up constant and no greater than about 12°.

7. The method of claim 6 wherein the helical angle is maintained between about 5° to 9°.

8. The method of claim 6 wherein the elastomer is a urethane elastomer.

*9. The composite cable of claim 1 wherein the helical angle is selected so as to control the elongation to maintain essentially constant cable length.*

*10. a method of making a composite cable of glass fiber rovings comprising the steps of:*

*helically winding a plurality of glass fiber rovings to form successive layers of increasing diameter;*

*surrounding the filaments of each of said rovings with an uncured elastomeric resin having a curing agent or hardener in contact therewith to form an elastomeric cable matrix; and*

*maintaining the helical angle of the initial and subsequent layers during a lay-up at a constant value selected to control thermal elongation effects on the cable.*

*11. The method of claim 10 wherein the thermal elongation effects on the cable are controlled such that the cable maintains essentially constant length under widely varying temperature conditions.*

*12. A composite cable in which thermal elongation effects are controlled under widely varying temperature conditions, the cable being fabricated by the process of helically winding a plurality of glass fiber rovings to form successive layers of increasing diameter, surrounding the filaments of each of said rovings with an uncured elastomeric resin having a curing agent or hardener in contact therewith to form a cable matrix, and maintaining the helical angle of the initial and subsequent layers during lay-up at a constant value selected to control thermal elongation effects on the cable.*

*13. The composite cable of claim 12 wherein the thermal elongation effects on the cable are controlled such that the cable maintains an essentially constant length under widely varying temperature conditions.*

* * * * *

UNITED STATES PATENT AND TRADEMARK OFFICE

CERTIFICATE OF CORRECTION

PATENT NO. : RE 29,133

DATED : February 8, 1977

INVENTOR(S) : Donald L. Snellman and William G. Hudson

It is certified that error appears in the above-identified patent and that said Letters Patent are hereby corrected as shown below:

Column 2, line 9, change "Fig." to -- Figs. --.

Claim 5, line 9, insert -- [abut] after "than"; change "about" to -- about --.

Claim 10, line 1, change "a", first occurance, to -- A --.

Signed and Sealed this

Twentieth Day of September 1977

[SEAL]

Attest:

RUTH C. MASON
Attesting Officer

LUTRELLE F. PARKER
Acting Commissioner of Patents and Trademarks